Figure 1:
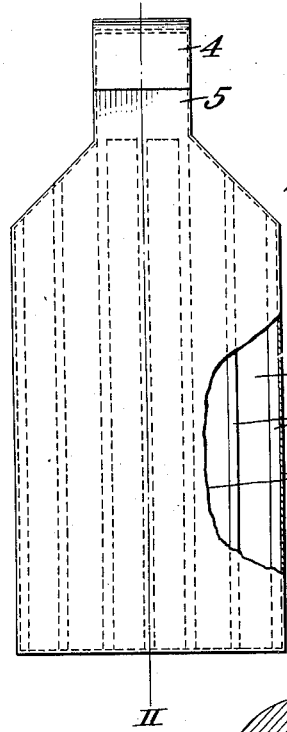

Sept. 23, 1924.                                                    1,509,186
                        R. C. BENNER ET AL
         STORAGE CELL, ELECTRODE THEREFOR, AND PROCESS OF MAKING THE SAME
                         Filed Aug. 16, 1922

Inventors:
Raymond C. Benner,
Harry F. French,
by Byrnes, Townsend & Bruckenstein
Attorneys.

Patented Sept. 23, 1924.

1,509,186

UNITED STATES PATENT OFFICE.

RAYMOND C. BENNER, OF BAYSIDE, AND HARRY F. FRENCH, OF FLUSHING, NEW YORK, ASSIGNORS TO THE PREST-O-LITE COMPANY, INC., A CORPORATION OF NEW YORK.

STORAGE CELL, ELECTRODE THEREFOR, AND PROCESS OF MAKING THE SAME.

Application filed August 16, 1922. Serial No. 582,248.

*To all whom it may concern:*

Be it known that we, RAYMOND C. BENNER and HARRY F. FRENCH, citizens of the United States, residing at Bayside and Flushing, respectively, in the county of Queens and State of New York, have invented certain new and useful Improvements in Storage Cells, Electrodes Therefor, and Processes of Making the Same, of which the following is a specification.

This invention relates to supports for the active material of storage cells, and has particular reference to the manufacture of supports for this purpose comprising a light-weight non-metallic body coated with a metal.

Storage batteries in which the battery plates or the like are made of lead are necessarily heavy, as the lead must be relatively thick to insure the requisite mechanical strength. On account of their weight, lead-plate batteries are objectionable for certain uses, for example in portable electric lighting devices. We have discovered that the weight of the battery may be materially reduced without sacrificing any substantial advantages, by making the active material support of a non-metallic substance and coating it with corrosion-resisting metal of good conductivity, for example, lead, or an alloy of lead and antimony.

The non-metallic substance to be coated with metal should be light, strong, and capable of being easily worked up into the desired form. A number of materials satisfy these requirements: wood, carbon or graphite, celluloid, hard rubber, and phenolic condensation products are among the suitable materials. Battery plates or grids made from any of these, when coated with metal as hereinafter described, are characterized by satisfactory conductivity and by freedom from objectionable distortion during service. The conductivity may be varied according to the intended service of the battery. Where a relatively high internal resistance is an advantage, as in batteries which are destined for intermittent connection to a low resistance work circuit, or in general where the storage cells are to replace dry cells, a non-conductive material will be used in the construction of the plate or grid and the current will pass only through the metallic coating. If high conductivity is desired, graphite or other conductive carbon may be used in the construction of the plate.

An important feature of our invention is the application of the lead coating by means of spraying the molten metal upon the plate. We have found that this method is much superior to electrical deposition. The sprayed coating, unlike that formed by electroplating, is characterized by a rough surface which facilitates the adherence of the active material. Also the sprayed metal will adhere directly to a non-conductive support, and the step of applying a conductive substance to permit the electro-deposition of the metal is eliminated. The metal may be applied by the well-known Schoop process or by any other spraying method accomplishing like results. The plates are preferably carried by a conveyor and interposed for a proper interval in the path of the metal spray. The simplicity of this procedure makes it well adapted for large scale production of battery plates.

Figure 2:
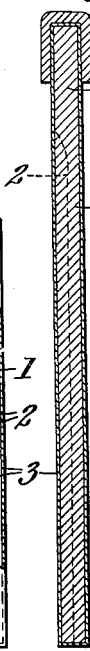
Figure 3:
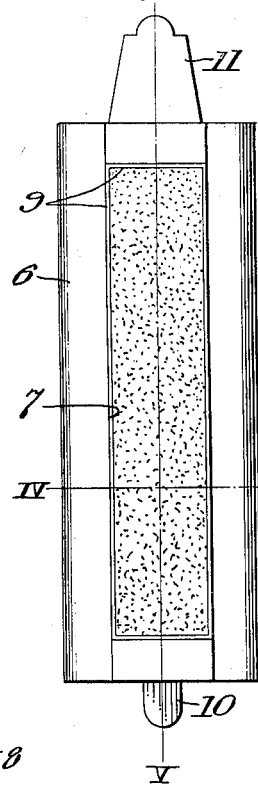
Figure 5:
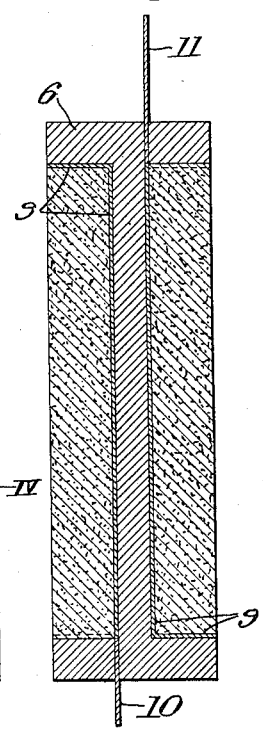
Figure 4:
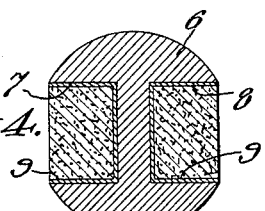
Figure 7:
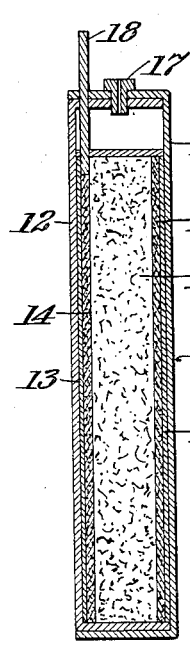
Figure 6:
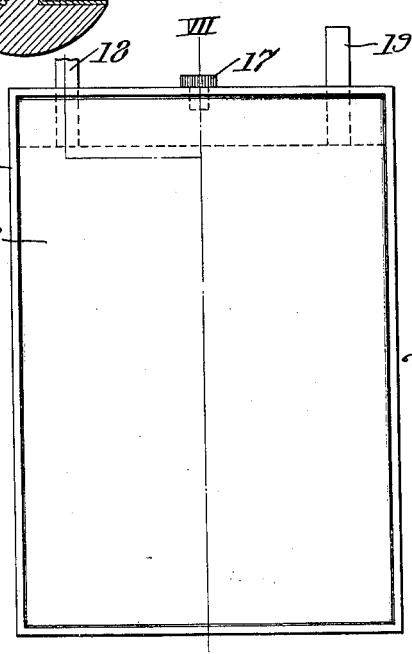

The invention will be described in connection with the accompanying drawing, in which Fig. 1 is a front elevation of a metal-coated ribbed wooden grid, Fig. 2 is a vertical section on line II—II, Fig. 1, Fig. 3 is a front elevation of a non-conducting support adapted to carry both positive and negative active materials, Fig. 4 is a horizontal section on line IV—IV, Fig. 3, Fig. 5 is a vertical section on line V—V, Fig. 3, Fig. 6 is a front elevation of a storage cell in which the container carries the active material; and Fig. 7 is a vertical transverse section on line 7—7, Fig. 6.

Referring to Figs. 1 and 2 of the drawings, reference numeral 1 denotes a wooden battery plate provided with ribs 2. A metallic coating 3, preferably of lead or lead-antimony alloy, covers the plate 1. The coating will usually be co-extensive with the plate surface, and substantially impervious to electrolyte, rendering special treatment of the wood unnecessary. In some cases, however, it may be desirable to impregnate the wood with substances such as paraffin or celluloid, to render it non-absorptive and acid resistant. A lead strip 4 is pressed upon the lug 5 forming part of plate 1, and a connector may be secured to the strip by burning or in any other suitable way.

In Figs. 3, 4 and 5, a cylindrical member 6 is provided with opposed grooves 7 and 8. Member 6 may be made of suitable non-conducting material, for example wood or hard rubber. The grooves are sprayed with lead to form the conductive coating 9. Positive and negative active materials are packed into the grooves 7 and 8, respectively, and conductor strips 10 and 11 are in electrical connection with the lead coating, as shown in Fig. 5. Cells provided with composite electrodes of this kind have an internal resistance approximating that of dry primary cells and are particularly adapted for use in flashlights of the tubular type commonly operated by such primary cells.

Referring to Figs. 6 and 7, 12 and 12′ indicate the telescoping halves of a box-like cell casing, preferably made of celluloid. The casing is coated internally on opposed sides with lead 13, preferably applied by spraying as above described. The active materials 14 and 15 are pasted upon the lead coated sides. The elimination of separate active material supporting plates, by the construction described, results in a material decrease in weight of the cell, without impairing its service capacity. An absorbent material 16 charged with electrolyte occupies the space between the active materials. If a proper absorbent material is used, it will be unnecessary to provide separators or other means for retaining the active material in position. We prefer for the absorbent a composition of glass wool and wood pulp, as described in the application of R. C. Benner, Serial No. 552,834, filed April 15, 1922. A vent 17 and conductor strips 18 and 19, in contact with the lead coating, are provided.

The casing 12, 12′, may be formed with corrugations or other surface irregularities to receive and hold the active material. Also, as an alternative to applying a lead coating, lead foil or the like may be secured in the bottom of each casing section.

Cells made up with active material supports prepared according to the present invention give a greater number of watt-hours per gram than do cells of the lead plate type. This result may be accompanied also by an increase in the number of watt-hours per cubic centimeter of cell volume. Our improved cells are therefore especially suited for use under conditions where small size and light weight are desirable characteristics.

We are aware that it has been proposed to electroplate non-conductive supports adapted to receive active material. Our invention, in distinction to this, resides in the application of metal spraying processes in the preparation of battery plates or the like of any desired form, and in certain advantageous features of cell construction. Various modifications of the specific forms of the invention shown may be made within the scope of the appended claims.

We claim:—

1. Process of preparing a support for the active material of storage cells, comprising subjecting a non-metallic body to a spray of metal in condition to adhere to the body, and removing the body when a metallic coating of the desired character has been formed.

2. Process of preparing a support for the active material of storage cells, comprising subjecting a wooden structure to a spray of lead in condition to adhere to the structure, and removing the structure when a lead coating of the desired character has been obtained.

3. Process of preparing a composite electrode for storage batteries, comprising forming a metallic coating on separate parts of a non-conductive support, and applying positive and negative active material to such separate metal-coated parts.

4. A storage cell comprising a casing of non-conductive material, a coating of metal adherent to the inner surface of opposed walls of said casing and active material in contact with said metal.

5. A storage cell comprising two members telescoped to form a box-like casing, a coating of lead adherent to the inner surface of the bottom of each of said members, active materials of opposite polarity in contact with the lead coatings, and an electrolyte absorbent filling the space between said active materials.

In testimony whereof, we affix our signatures.

RAYMOND C. BENNER.
HARRY F. FRENCH.